US012508050B2

(12) United States Patent
Gyrn

(10) Patent No.: US 12,508,050 B2
(45) **Date of Patent: *Dec. 30, 2025**

(54) INSERTER FOR SIMULTANEOUS INSERTION OF MULTIPLE TRANSCUTANEOUS PARTS

(71) Applicant: UnoMedical A/S, Lejre (DK)

(72) Inventor: Steffen Gyrn, Ringsted (DK)

(73) Assignee: UnoMedical A/S, Lejre (DK)

( * ) Notice: Subject to any disclaimer, the term of this patent is extended or adjusted under 35 U.S.C. 154(b) by 1078 days.

This patent is subject to a terminal disclaimer.

(21) Appl. No.: 17/526,119

(22) Filed: Nov. 15, 2021

(65) Prior Publication Data

US 2022/0071657 A1 Mar. 10, 2022

Related U.S. Application Data

(63) Continuation of application No. 14/363,282, filed as application No. PCT/EP2012/068928 on Sep. 26, 2012, now Pat. No. 11,197,689.

(60) Provisional application No. 61/543,406, filed on Oct. 5, 2011.

(51) Int. Cl.

*A61B 17/34* (2006.01)
*A61B 5/00* (2006.01)
*A61M 5/158* (2006.01)

(52) U.S. Cl.

CPC ........ *A61B 17/3403* (2013.01); *A61B 5/6847* (2013.01); *A61B 17/3421* (2013.01); *A61M 5/158* (2013.01); *A61B 2017/3409* (2013.01); *A61M 2005/1585* (2013.01)

(58) Field of Classification Search

CPC .............. A61B 17/3403; A61B 5/6847; A61B 17/3421; A61B 2017/3409; A61M 5/158; A61M 2005/1585

See application file for complete search history.

(56) References Cited

U.S. PATENT DOCUMENTS 11,027,058 B2 6/2021 Lanier, Jr. et al.
11,136,971 B2 10/2021 Kamen et al.
11,136,972 B2 10/2021 Kamen et al.
11,179,514 B2 11/2021 Yodfat et al.

(Continued)

FOREIGN PATENT DOCUMENTS

EP 3881874 A1 9/2021
EP 3662967 B1 11/2021

(Continued)

*Primary Examiner* — Rex R Holmes

(74) *Attorney, Agent, or Firm* — TAFT STETTINIUS HOLLISTER LLP; Ryan O. White; Derek B. Lavender

(57) ABSTRACT

An inserter (100) for subcutaneous insertion of multiple transcutaneous parts (212, 222), the multiple transcutaneous parts at least comprising: a first transcutaneous part (212) comprising a first body (214) from where a first subcutaneous part (216) extends, and a second transcutaneous part (222) comprising a second body (224) from where a second subcutaneous part (226) extends, wherein the inserter comprises: support means for guiding the multiple transcutaneous parts during insertion of the multiple transcutaneous parts, and activation means for activating the inserter, whereby simultaneously insertion of the multiple transcutaneous parts subcutaneously in the patient's skin is initiated.

8 Claims, 15 Drawing Sheets

A A B B 108 104 102 110 106

(56) References Cited

U.S. PATENT DOCUMENTS 11,197,689 B2 * 12/2021 Gyrn .................. A61B 17/3403
11,261,858 B2 3/2022 Kamen et al.
11,293,425 B2 4/2022 Kamen et al.
11,318,249 B2 5/2022 Kamen et al.
11,339,774 B2 5/2022 Gray et al.
11,357,910 B2 6/2022 Kamen et al.
11,364,335 B2 6/2022 Anigan et al.
11,386,482 B2 7/2022 Estes
11,391,273 B2 7/2022 Kamen et al.
11,404,776 B2 8/2022 Blumberg, Jr.
11,406,753 B2 8/2022 Gray et al.
11,408,414 B2 8/2022 Kamen et al.
11,413,391 B2 8/2022 Gray
11,478,623 B2 10/2022 Lanigan et al.
11,491,273 B2 11/2022 Gray
11,497,846 B2 11/2022 Kamen et al.
11,534,543 B2 12/2022 Kamen et al.
11,690,952 B2 7/2023 Kamen et al.
11,690,953 B2 7/2023 Lawrence et al.
11,701,300 B2 7/2023 Lanier, Jr. et al.
11,707,567 B2 7/2023 Kamen et al.
11,712,513 B2 8/2023 Gray et al.
11,712,517 B2 8/2023 Lawrence et al.
11,717,609 B2 8/2023 Kamen et al.
11,738,139 B2 8/2023 Gray
11,786,651 B2 10/2023 Kamen et al.
11,813,427 B2 11/2023 Kamen et al.
11,878,143 B2 1/2024 Politis et al.
11,904,134 B2 2/2024 Gray
11,964,126 B2 4/2024 Lanier, Jr. et al.
11,992,650 B2 5/2024 Kamen et al.
2021/0060241 A1 3/2021 Kamen et al.
2021/0170097 A1 6/2021 Kamen et al.
2021/0178074 A1 6/2021 Anderson et al.
2021/0180583 A1 6/2021 Gray
2021/0180584 A1 6/2021 Kamen et al.
2021/0190063 A1 6/2021 Gray
2021/0228798 A1 7/2021 Kamen et al.
2021/0268174 A1 9/2021 Estes et al.
2021/0270255 A1 9/2021 Gray
2021/0293232 A1 9/2021 Kamen et al.
2021/0321914 A1 10/2021 Brister et al.
2021/0338926 A1 11/2021 Kamen et al.
2021/0361858 A1 11/2021 Lanier, Jr. et al.
2021/0393870 A1 12/2021 Kessel et al.
2021/0393939 A1 12/2021 Lanigan et al.
2021/0396221 A1 12/2021 Kamen et al.
2022/0023544 A1 1/2022 Anderson et al.
2022/0105261 A1 4/2022 Yodfat et al.
2022/0211937 A1 7/2022 Kamen et al.
2022/0249769 A1 8/2022 Kamen et al.
2022/0265918 A1 8/2022 Kamen et al.
2022/0275796 A9 9/2022 Kamen et al.
2022/0280715 A1 9/2022 Gray et al.
2022/0379013 A1 12/2022 Kamen et al.
2023/0226271 A1 7/2023 Lanigan et al.
2023/0226273 A1 7/2023 Kamen et al.
2023/0226274 A1 7/2023 Kamen et al.
2023/0233756 A1 7/2023 Lanier et al.
2023/0372606 A1 11/2023 Kamen et al.
2024/0042127 A1 2/2024 Kamen et al.
2024/0066214 A1 2/2024 Kamen et al.
2024/0148964 A1 5/2024 Politis et al.
2024/0195058 A1 6/2024 Blumberg, Jr.
2024/0197984 A1 6/2024 Murphy et al.

FOREIGN PATENT DOCUMENTS

EP 3650370 B1 12/2021
EP 3988147 A1 4/2022
EP 3998095 A1 5/2022
EP 2611478 B1 8/2022
EP 3470100 B1 8/2022
EP 3998095 B1 1/2024
EP 3656699 B1 6/2024
EP 4385551 A2 6/2024

* cited by examiner 300
304
308
302
306
310

410
412
404

406
416
402
416
414
404
414

402
416
408
406
400

INSERTER FOR SIMULTANEOUS INSERTION OF MULTIPLE TRANSCUTANEOUS PARTS

CROSS-REFERENCE TO RELATED APPLICATION(S)

The present application is a continuation of, and claims the priority benefit of, U.S. patent application Ser. No. 14/363,282, which was filed on Jun. 5, 2014 and is patented as U.S. Pat. No. 11,197,689, and which is a U.S. National Phase Application of International Patent Application No. PCT/EP2012/068928, which was filed on Sep. 26, 2012 and is published, and which claims priority to U.S. Provisional Patent Application No. 61/543,406, which was filed on Oct. 5, 2011. The disclosures of those applications are incorporated by reference herein in their entireties.

The invention concerns an inserter for simultaneous insertion of at least two transcutaneous parts.

BACKGROUND

An inserter, also called inserter device or an injector, is commonly used in the medical field for inserting medical devices, such as cannula devices for being connected to infusion sets, sensors or the like, through the skin of a patient in a more or less automated fashion.

Commonly, when using an inserter, the user, i.e. the patient or a treatment provider such as a nurse, a doctor, a relative, or the like, has to apply a force towards the surface of the skin of the patient in order to provide injection of the medical device or a part of the medical device having the form of a needle, a cannula, a sensor, or the like. This can cause physiological or psychological distress and/or discomfort, and may lead to inappropriate application of the medical device. Many people are afraid of sharp objects, such as injection needles and other penetrating devices commonly used for medical treatment and therapy. This fear is often irrational, and it may hamper an appropriate medical treatment. For example in the case of self-medication, a lack of administration of an appropriate dose of a required medical composition can lead to complications, which may even be life-threatening. When treating diabetes, e.g. in juveniles, there is a risk that the required insulin-dose may not be self-administered due to irrational fear of the insertion needle, combined with a general lack of knowledge and awareness concerning the consequences of omitting the correct application of the device and dosage.

A further known issue with insertion of medical devices is the risk of contamination of the penetrating member before or during application. This can easily lead to the introduction of an infection to a patient, e.g. through a contaminated insertion needle. It is further well known that contact with an infected, used needle—especially in hospital environments—can be life-threatening, and the risk of accidental exposure to contaminated material in the form of a used insertion needle must be minimized.

When treating e.g. diabetes it is important to administer the correct amount of insulin to the patients several times during the day. It is therefore essential to regularly monitor the effect of the insulin by e.g. measuring the patient's blood sugar level in order to ensure that the patient receives the correct insulin dosage. Often a cannula part included in an infusion part for administrating insulin to the patient is inserted using one inserter and a sensor device is inserted using a another inserter. The cannula part in the infusion set and the sensor are often inserted at different locations on the patient's body. Thus, consequently, the patient needs to insert two transcutaneous parts individually.

US2008/0004515 discloses an integrated system, wherein a sensor and an on-body patch pump provided with one or more cannulas are combined. The document only describes the combined patch pump/sensor system in broad terms and is silent on how the sensor and the cannula(s) are inserted in the patient's skin.

US2004/0162521 discloses a needle device comprising a housing, a base portion having a mounting surface adapted for application to the skin of a patient, and a plurality of needles. Each needle comprises a distal pointed end adapted to penetrate the skin of a patient. Also, each needle has a first position in which the distal end is retracted relative to the mounting surface and a second position in which the distal end projects from the mounting surface. The US2004/0162521 needle device has to have a height at least corresponding to the length of a needle, as it must contain the needles before and after use in their full length extending in a perpendicular direction relative to the mounting surface. The needle device functions as both an inserter and as a transcutaneous part device in one. Thus, the entire quite large device is attached onto the patient's skin all the time during use, which is not particularly comfortable for the patient. Further, the subcutaneous parts according to the shown embodiments have to be hard, self-penetrating cannulas provided with a side inlet opening.

Thus, there is an obvious need in the art for a robust, reliable, accurate, safe, hygienic, and user friendly insertion device, which addresses the issues discussed above.

DESCRIPTION OF THE INVENTION

Disclosed herein is an inserter for subcutaneous insertion of multiple transcutaneous parts, the multiple transcutaneous parts at least comprising a first transcutaneous part comprising a first body from where a first subcutaneous part extends, and a second transcutaneous part comprising a second body from where a second subcutaneous part extends, wherein the inserter comprises support means for guiding the multiple transcutaneous parts during insertion of the multiple transcutaneous parts, and activation means for activating the inserter, whereby simultaneously insertion of the multiple transcutaneous parts subcutaneously in the patient's skin is initiated. Thereby is provided a simultaneous insertion of multiple transcutaneous parts, using the compact, robust, reliable, accurate, safe, hygienic, and user friendly inserter according to the above.

In one or more embodiments the support means comprises a functional first part with a proximal first part supporting the multiple transcutaneous parts in a pre-use position.

In one or more embodiments the support means further comprises multiple introducer needles comprising at least a first introducer needle supporting the first subcutaneous part in the pre-use position and a second introducer needle supporting the second subcutaneous part in the pre-use position.

In one or more embodiments the first introducer needle is extending through, partly surrounding or fully surrounding the first subcutaneous part in the pre-use position and the second introducer needle is extending through, partly surrounding or fully surrounding the second subcutaneous part in the pre-use position.

In one or more embodiments the first transcutaneous part and/or the second transcutaneous part is a sensor.

In one or more embodiments the first transcutaneous part and/or the second transcutaneous part is a cannula part.

In one or more embodiments the inserter comprises a cover and the activation means are activation points positioned on the cover.

In one or more embodiments the activation of the inserter is initiated by applying a pressure to activation points in a direction substantially perpendicular to the direction of insertion.

In one or more embodiments the inserter further comprises driving means, wherein upon activation of the inserter, the driving means drives the inserter from the pre-use position to an inserted position, wherein the multiple transcutaneous parts are inserted in the patient's skin in the inserted position.

In one or more embodiments the driving means is a primary spring extending in the direction of insertion.

In one or more embodiments the primary spring upon activation of the inserter translates from a loaded position to an unloaded position, thereby promoting the multiple transcutaneous parts from the pre-use position to the inserted position, where the multiple transcutaneous parts are inserted subcutaneously in the patient's skin.

In one or more embodiments the inserter further comprises a first functional part having a proximal first part with a distal surface, the distal surface supporting the primary spring, wherein the primary spring pushes the first functional part from a first position to a second position as the primary spring translates from the loaded position to the unloaded position.

In one or more embodiments the inserter further comprises a release ring, which in the first position engages with the first functional part securing it in the pre-use position and in the second position no longer engages with the first functional part, whereby the primary spring translates from the loaded position to the unloaded position.

In one or more embodiments the inserter after insertion of the transcutaneous part automatically translates to a retracted position where the inserter is separated from the multiple transcutaneous parts.

In one or more embodiments the translation to the retracted position is promoted by retraction means.

In one or more embodiments the retraction means comprises a secondary spring extending in the direction of insertion.

In one or more embodiments the inserter further comprises a functional second part supporting the secondary spring, wherein the secondary spring after insertion of the multiple transcutaneous parts translates from a loaded position to an unloaded position, thereby promoting the functional second part from the inserted position to a retracted position, whereby the inserter is separated from the multiple transcutaneous parts.

In one or more embodiments the distal surface of the proximal first part supports the secondary spring.

In one or more embodiments the multiple introducer needles are attached unreleasably to the functional second part.

DETAILED DESCRIPTION

In the following description, proximal refers to a surface, part or similar which points towards the patient's skin during insertion and distal refers to a surface, part or similar which points away from the patient's skin during insertion.

Figures 1A, 1B, 1C:
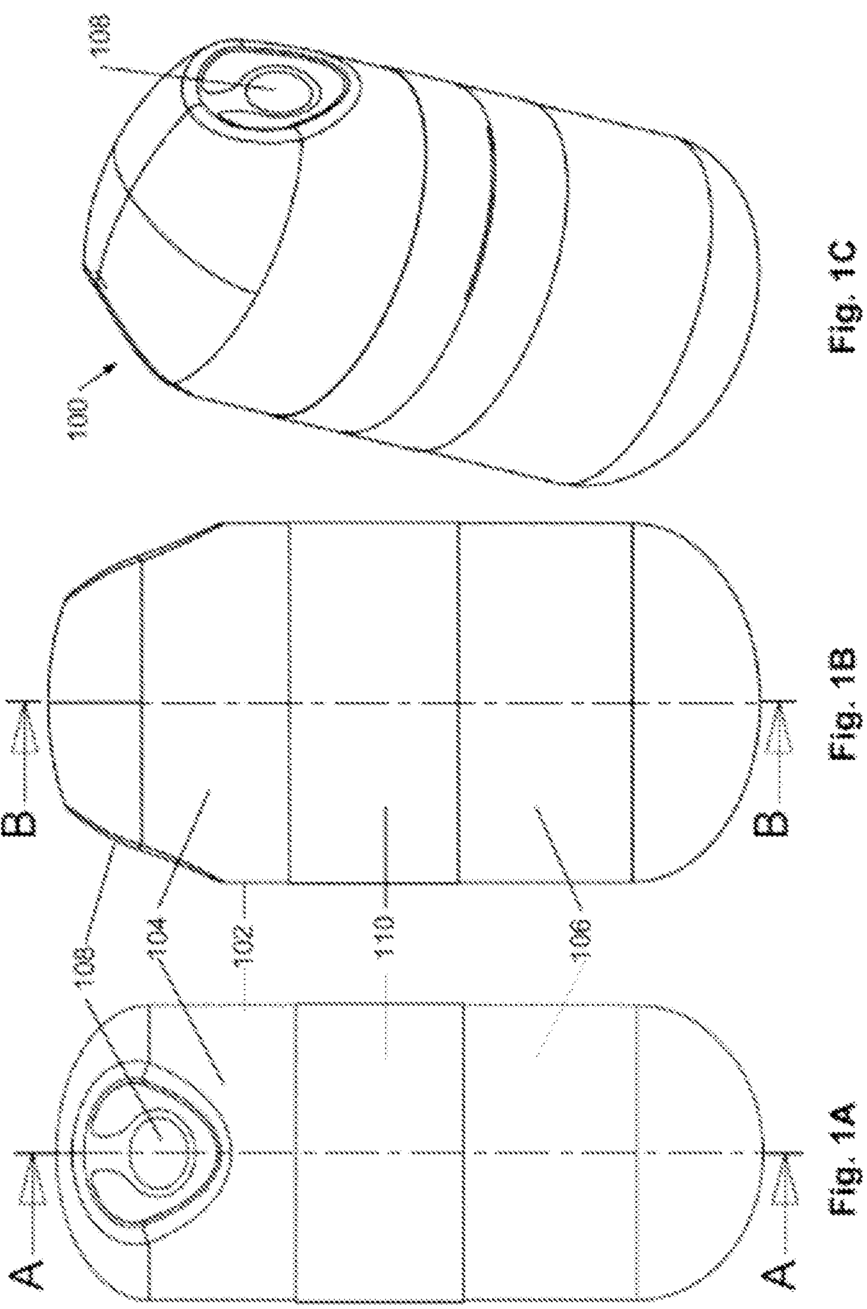
FIGS. 1A-B show the inserter in a shelf position with a marked cut through along the line A-A in FIG. 1A, a marked cut through along the line B-B in FIGS. 1B and 1*n* a perspective view in FIG. 1C.

FIGS. 1A-C show an inserter 100 according to the invention in a shelf state before use. The embodiment of the inserter 100 has automatic insertion and automatic retraction of multiple introducer needles 218, 228 and is used for placing a base part 204 on the skin of the patient combined with inserting multiple transcutaneous parts 212, 222 subcutaneously in a patient.

The inserter 100 comprises a two-part cover 102 comprising a first cover part 104 and a second cover part 106, wherein the first cover part 104 and the second cover part 106 defines a cavity. Contained inside the cavity is found an inner inserter part 200 comprising several functional parts.

During production, a tamperproof band 110 is placed around the inserter 100 such that it covers the intersection between the first cover part 104 and the second cover part 106. The tamperproof band 110 can be penetrated by sterilizing gas and is therefore placed around the inserter 100 before sterilization. An intact tamperproof band 110 ensures that the second cover part 106 has not been separated from the first cover part 104 after sterilization of the inserter 100, i.e. correct placement of the tamperproof band 110 indicates to the user that the disposable inserter 100 is sterile and ready for use. When using the inserter 100, the tamperproof band 110 is removed thereby allowing the second cover part 106 to be separated from the first cover part 104.

After the tamperproof band 110 and the second cover part 106 have been removed from the first cover part 104, the inserter 100 can be placed on a patient's skin and activated by applying a pressure on the activation points 108 (positioned on the first cover part 104) in the direction towards the inner inserter part 200. The activation points 108 are normally made in a soft material such that they can be pushed towards each other without displacing the remaining part of the first cover part 104.

By applying a pressure to the activation points 108, simultaneously subcutaneous insertion of at least two transcutaneous parts 212, 222 in a patient's skin is initiated. The transcutaneous parts 212, 222 comprise subcutaneous parts 216, 226, which after insertion penetrate the patient's skin subcutaneously. The subcutaneous parts 216, 226 can be e.g. a cannula part and/or a sensor. If the subcutaneous parts 216, 226 are of a soft material, the insertion is normally assisted by using introducer needles 218, 228. The introducer needles 218, 228 can extend through the subcutaneous parts 216, 226 or surround it partly or fully. After insertion of the transcutaneous parts 212, 222, the introducer needles 218, 228 are automatically retracted again. The introducer needles 218, 228 can be omitted if the subcutaneous parts 216, 226 are of a sufficient hard material adequate for penetrating the patient's skin at their own.

Figure 2A:
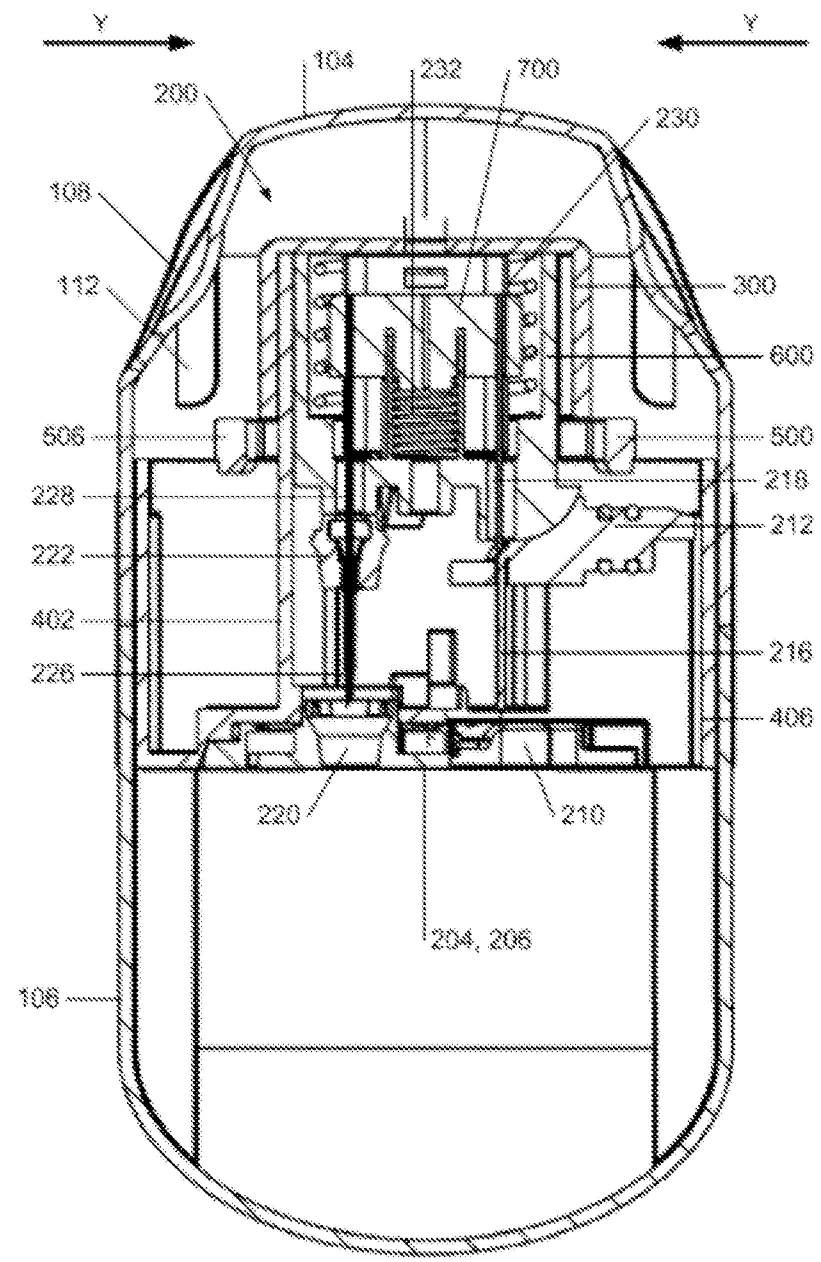
FIG. 2A shows the inserter in a shelf position in a cut through along the line A-A shown in FIG. 1A
Figure 2B:
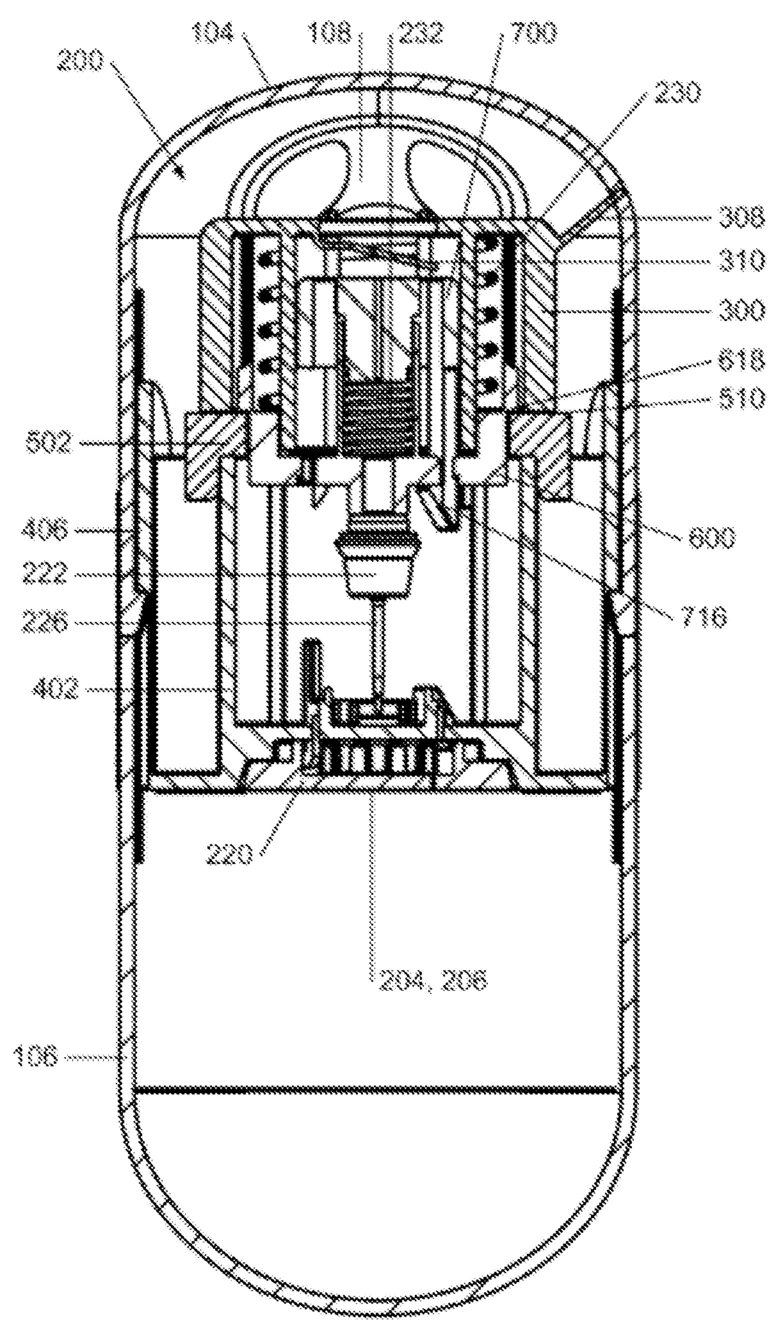
FIG. 2B shows the inserter in a shelf position in a cut through along the line B-B shown in FIG. 1B.
Figure 3A:
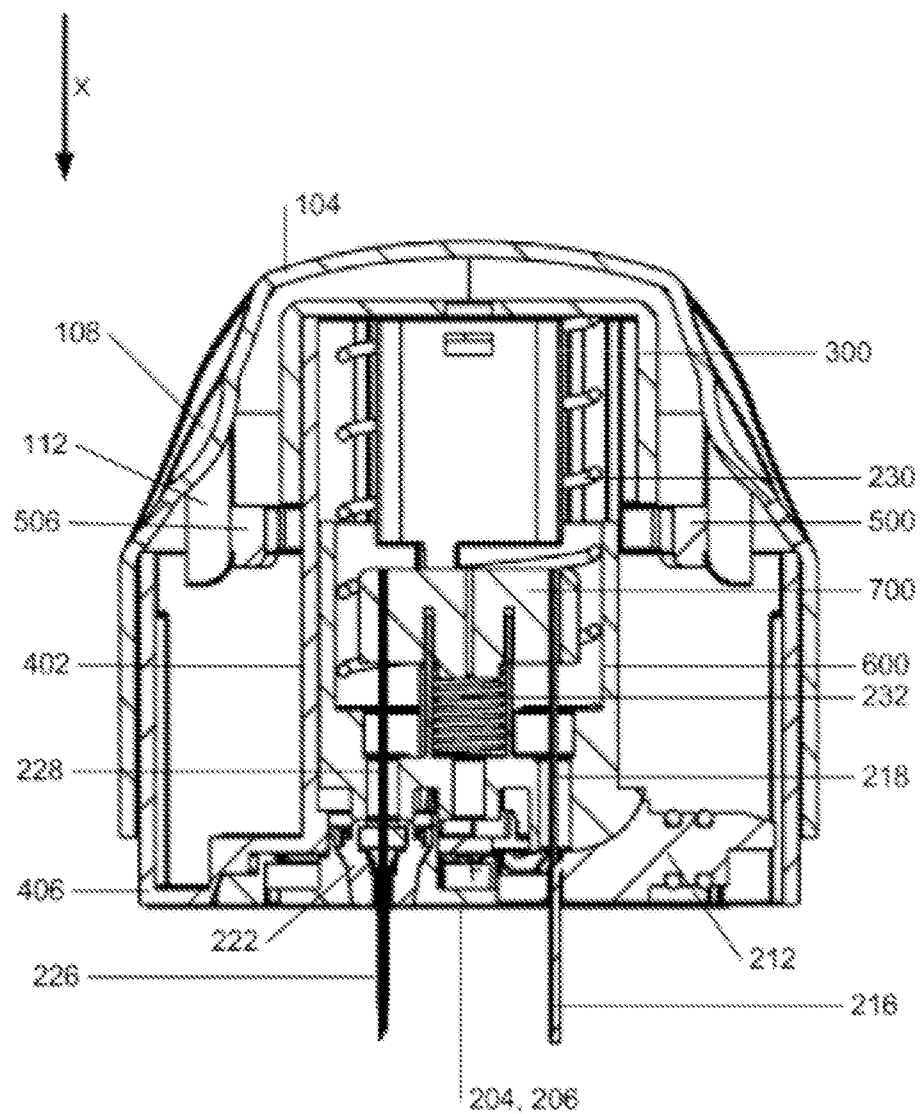
FIG. 3A shows the inserter in an inserted position in a cut through along the line A-A shown in FIG. 1A
Figure 3B:
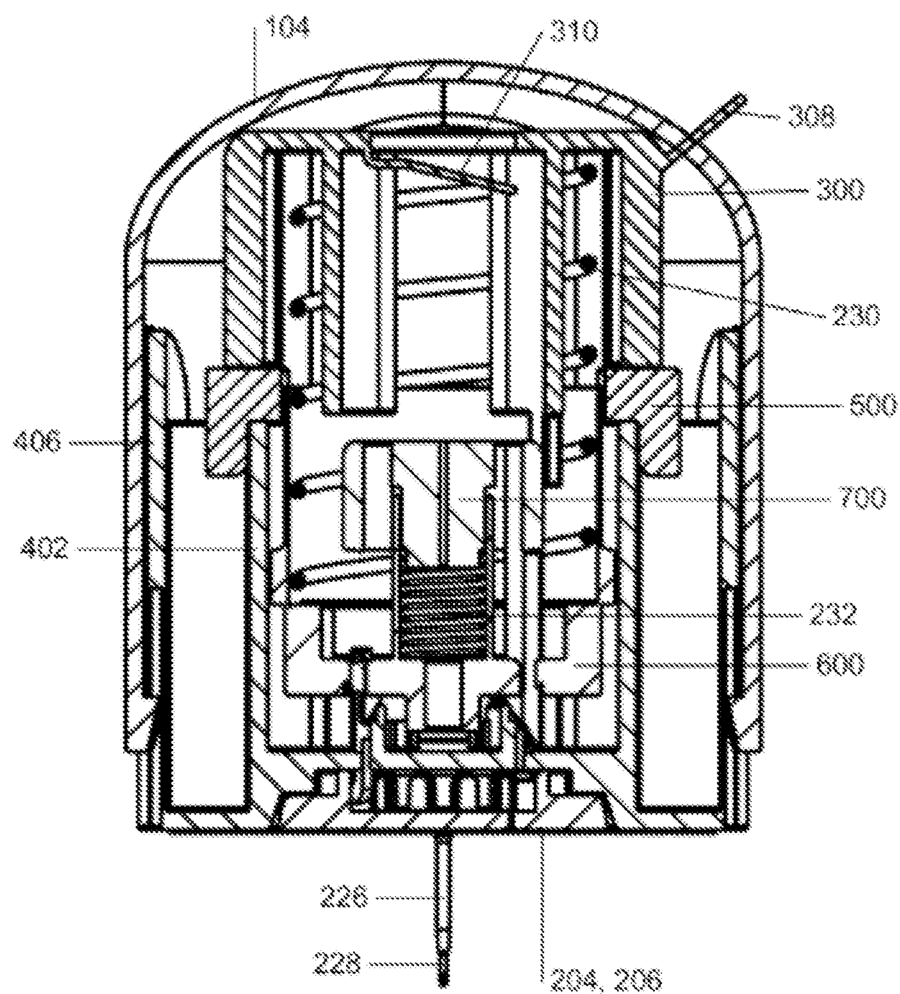
FIG. 3B shows the inserter in an inserted position in a cut through along the line B-B shown in FIG. 1B.
Figure 4A:
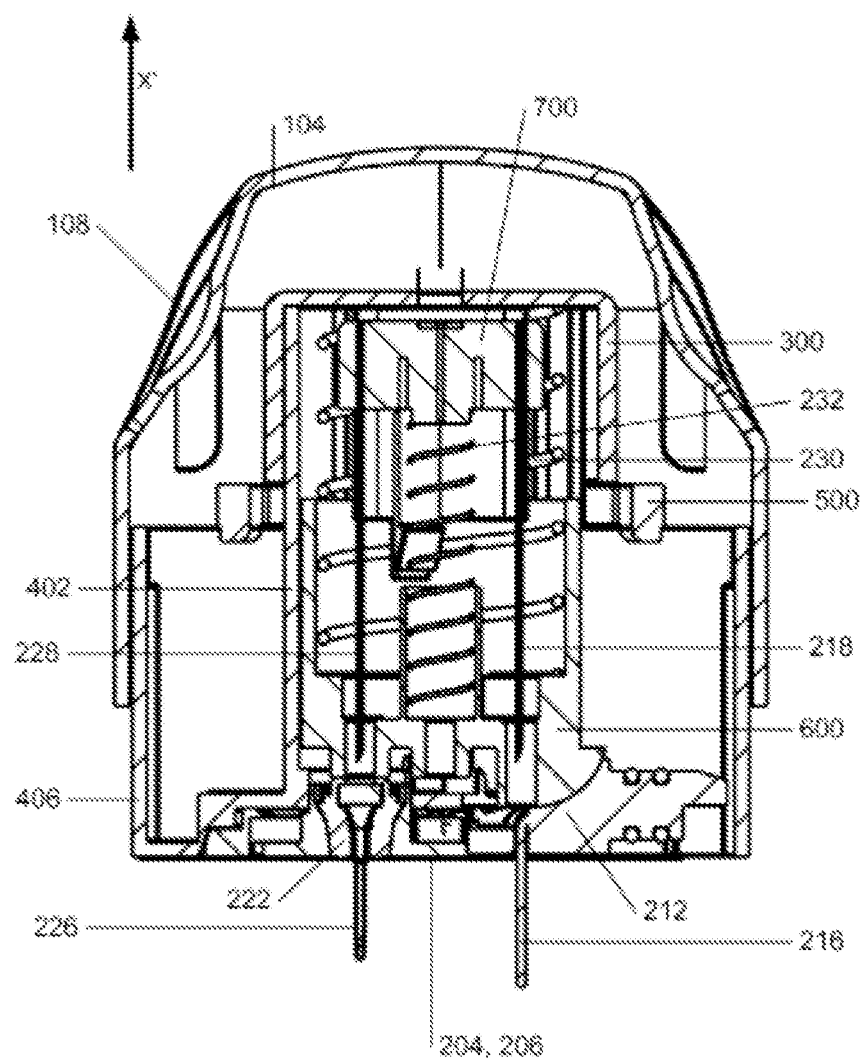
FIG. 4A shows the inserter in a retracted position in a cut through along the line A-A shown in FIG. 1A

FIGS. 2A, 3A and 4A show a cut-through view of the inserter 100 along the A-A line marked in FIG. 1A and FIGS. 2B, 3B and 4B show a cut-through view of the inserter 100 along the B-B line marked in FIG. 1B. Thereby is provided a view of the inner inserter part 200 containing the different functional parts.

In FIGS. 2A-B, the inserter 100 is in the pre-use shelf state before the tamperproof band 110 and the second cover part 106 of the two-part cover 102 have been removed. The inserter 100 shown in this embodiment is also provided with a safety function preventing unintended activation of the inserter 100 prior to use, by insuring that the first cover part 104 cannot move relative to the inner inserter part 200. In order to be able to activate the inserter 100, it is therefore necessary to push the first cover part 104 down until inner activation means having the form of two oppositely positioned protruding parts 112 attached to and/or being part of the inner surface of the first cover part 104 are placed opposite release positions 506 on the release ring 500. Pushing the first cover part 104 down cannot be achieved before the second cover part 106 has been separated from the first cover part 104. In the shelf state shown in FIGS. 2A-B, it is thus not possible to activate the insertion, as the protruding parts 112 are not correctly positioned opposite the release positions 506 on the release ring 500.

FIGS. 3A-B show the inserter 100 after the tamperproof band 110 and the second cover part 106 have been removed and the insertion has been activated by pressing the action points 108. In FIGS. 3A-B, the insertion is at the point where the transcutaneous parts 212, 222 have been inserted in a patient's skin, but the introducer needles 218, 228 have not been retracted.

Figure 4B:
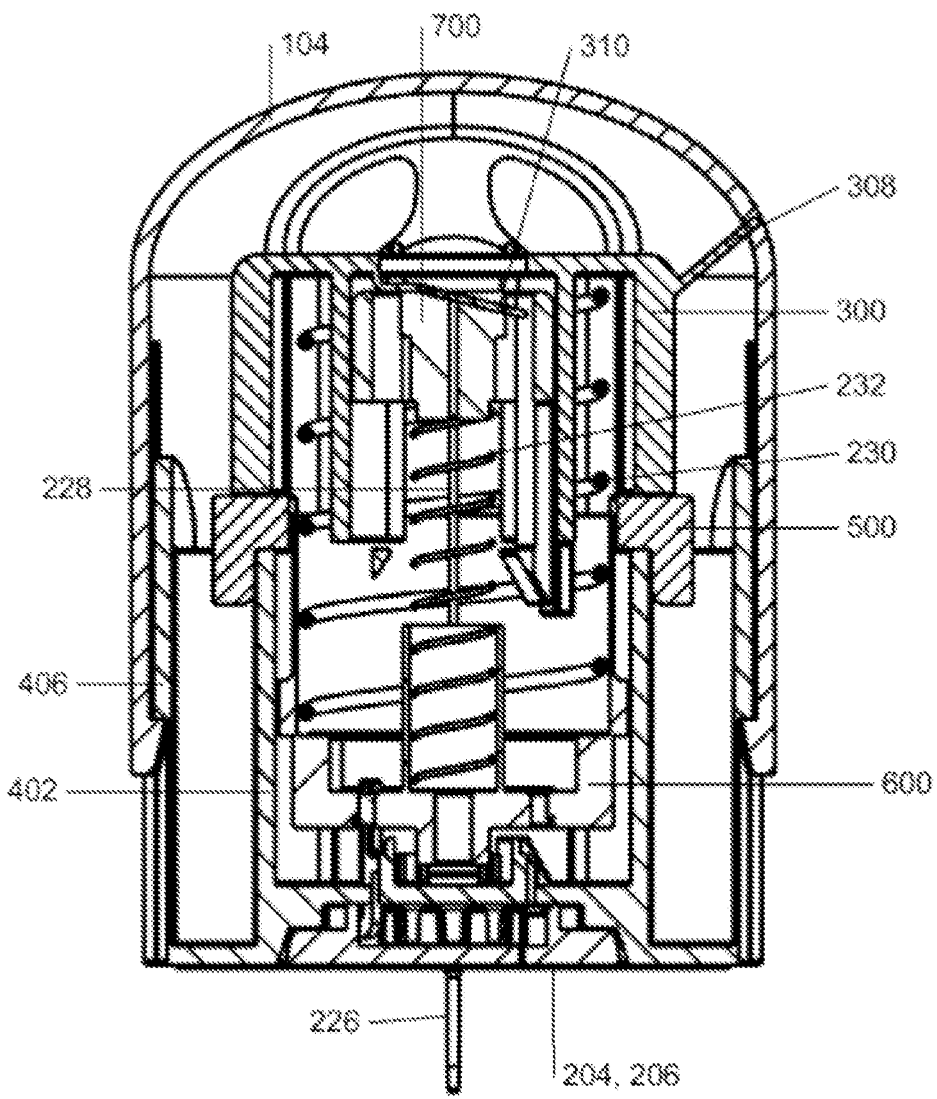
FIG. 4B shows the inserter in a retracted position in a cut through along the line B-B shown in FIG. 1B.

The fully retracted position, where the introducer needles 218, 228 are retracted inside the inner inserter part 200 of the inserter 100 is shown in FIGS. 4A-B.

Figure 5:
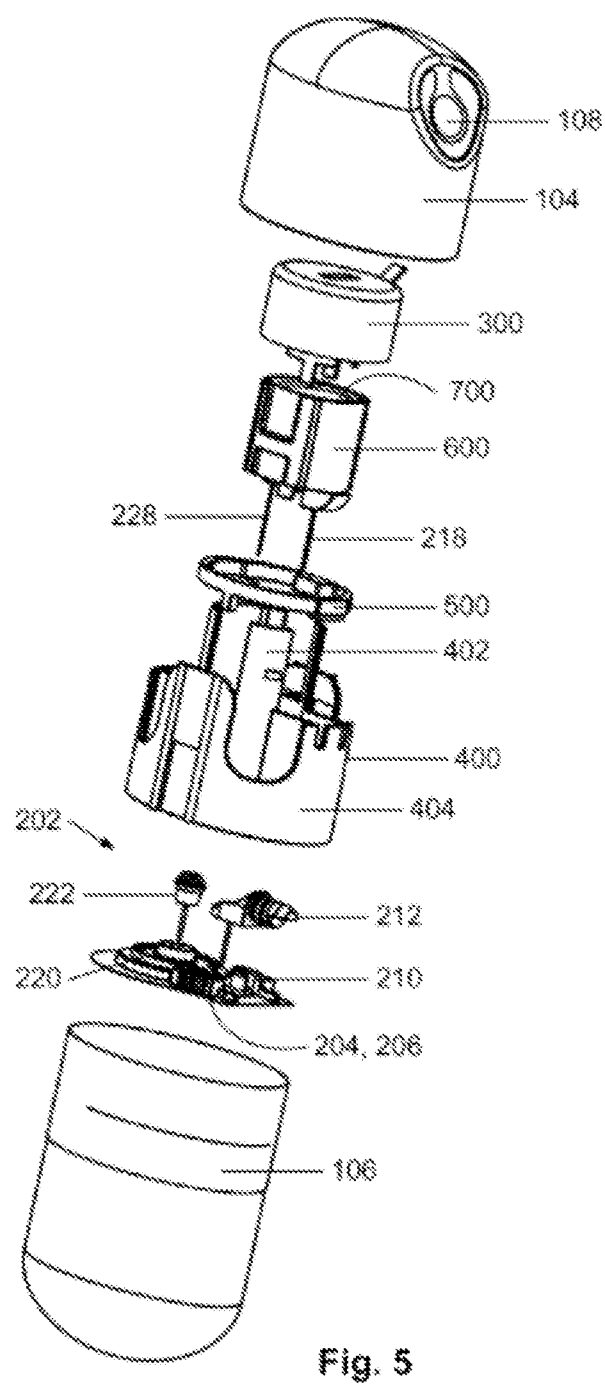
FIG. 5 shows an exploded view of the inserter in the shelf position.
Figure 6:
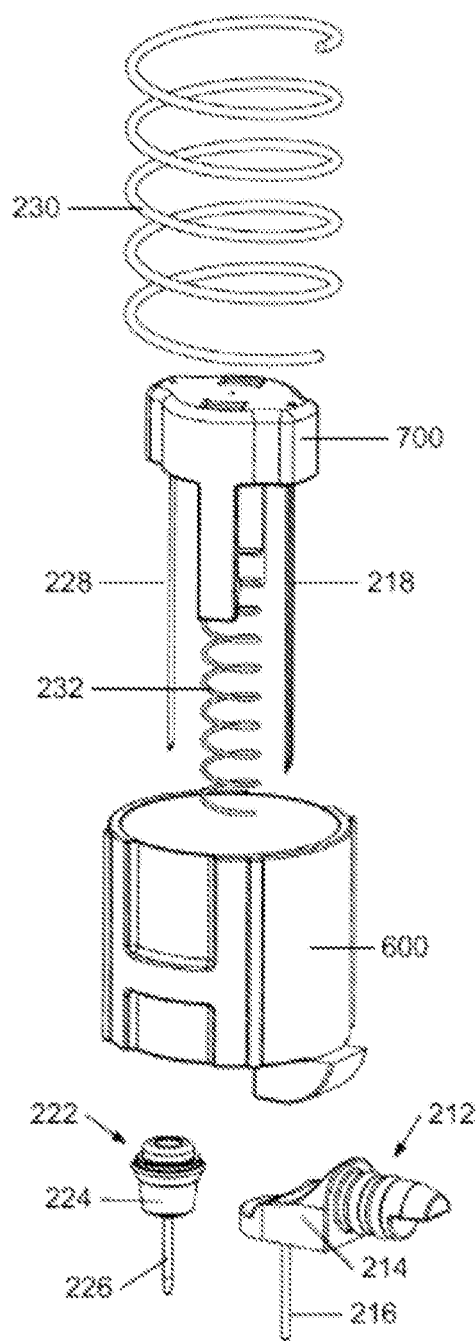
FIG. 6 shows an exploded close-up view of the functional first part, the functional second part, the transcutaneous parts, the springs and the introducer needles.
Figure 9:
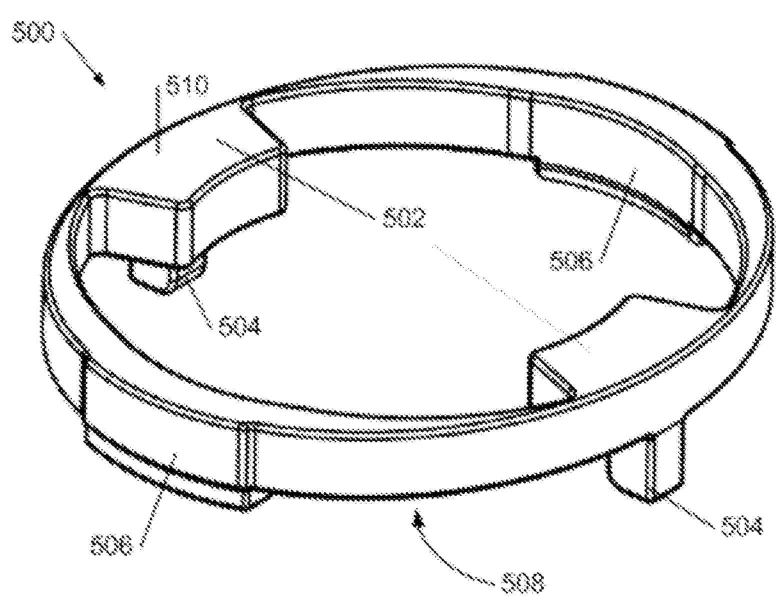
FIG. 9 shows the release ring of the inner inserter part in a perspective view.
Figures 10A, 10B, 10C:
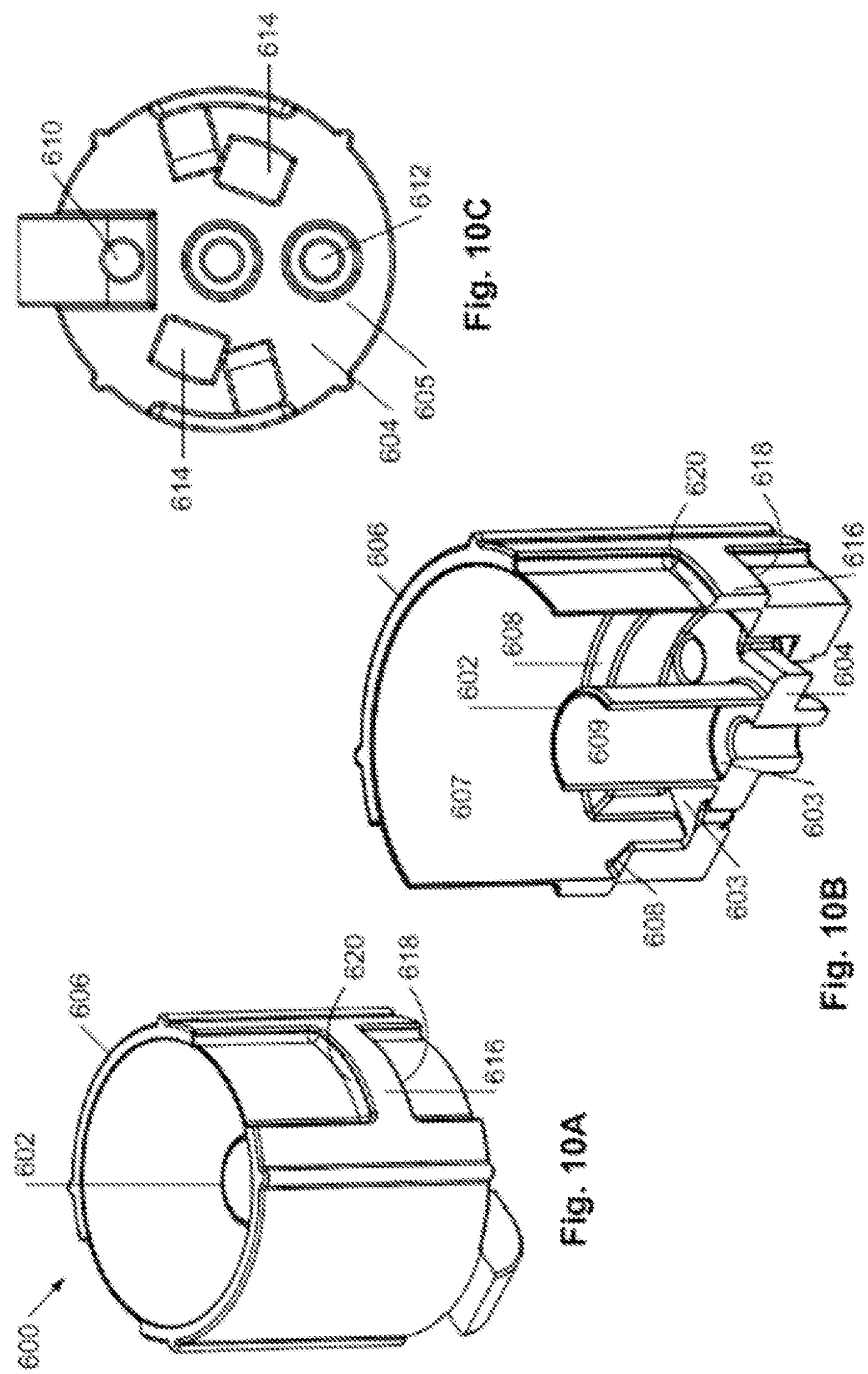
FIGS. 10A-C show the functional first part of the inner inserter part in a perspective view (FIG. 10A), a perspective cut-through view (FIG. 10B) and a 'bottom' view (FIG. 10C).
Figure 11B:
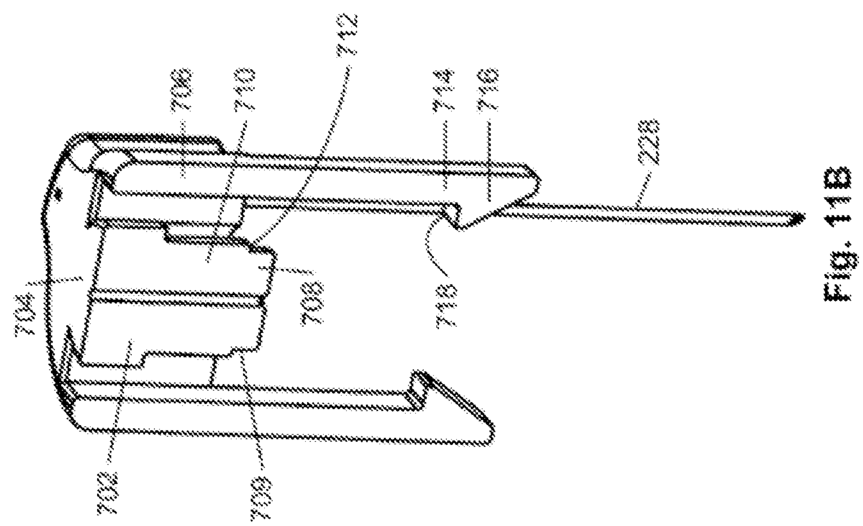
FIGS. 11A-B show the functional second part of the inner inserter part in a perspective view (FIG. 11A) and a perspective cut-through view (FIG. 11B).
Figure 11A:
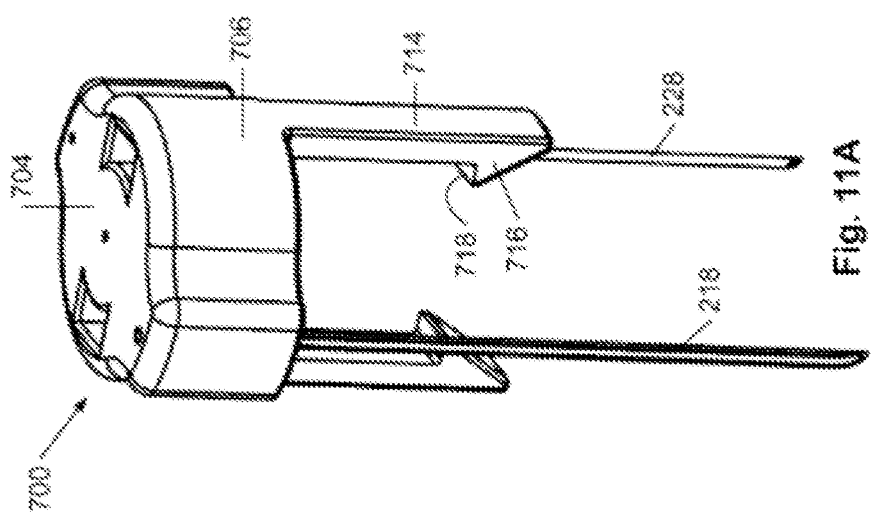
Figure 12:
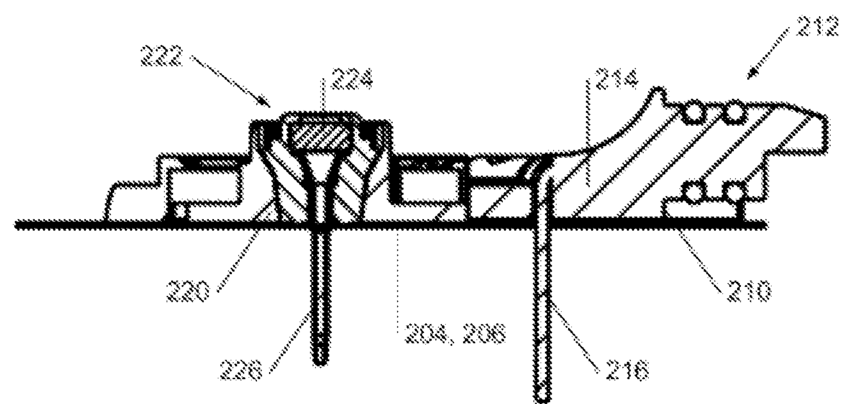
FIG. 12 shows the transcutaneous parts inserter in the base part.

The inner inserter part 200 of the inserter 100 comprises different individual inner functional parts;

- a base part 202 (shown in detail in FIG. 5 and FIG. 12) comprising ports 210, 220 in which the transcutaneous parts 212, 222 are attached during insertion;
- a cap 300 (shown in detail in FIGS. 7A-C);
- a housing 400 (shown in detail in FIGS. 8A-C);
- a release ring 500 (shown in detail in FIG. 9);
- a functional first part 600 (shown in detail in FIGS. 10A-C) functioning as an insertion part, which is released from the release ring during insertion;
- a functional second part 700 (shown in detail in FIGS. 11A-B) functioning as a retraction part, which is released from the insertion part during retraction;
- a primary spring 230 placed between the cap 300 and the functional first part 600 (shown in detail in e.g. FIG. 6);
- a secondary spring 232 placed between the functional second part 700 and the functional first part 600 (shown in detail in e.g. FIG. 6), and
- introducer needles 218, 228 (shown in detail in e.g. FIG. 6 and FIGS. 11A-B) attached to the functional second part 700.

All of the individual parts are normally made of moulded plastic except e.g. the introducer needles 218, 228 which might be made of metal.

The base part 202 is positioned at the proximal end of the inner inserter part 200. The skin facing proximal surface 204 of the base part 202 normally comprises an adhesive surface 206 for ensuring a releasable attachment of the base part 202 to the patient's skin. The adhesive surface 206 can be exposed automatically upon removal of the second cover part 106 or it could be exposed manually e.g. by removing a release paper from the adhesive surface 206 before use. When the adhesive surface 206 is exposed, the proximal end of the inserter 100 comprising the base part 202 is pushed against the skin of the patient.

The base part 202 comprises a first port 210 and a second port 220 for containing the first transcutaneous part 212 and the second transcutaneous part 222, respectively. In the figures, two transcutaneous ports 210, 220 and two transcutaneous parts 212, 222 are shown, but three, four or more 'ports and parts pairs' could also be imagined. In the embodiment shown in the figures, the first transcutaneous part 212 is a sensor and the second transcutaneous part 222 is a cannula for providing fluid connection to a liquid such as e.g. insulin. However, both transcutaneous parts could also be cannulas and/or sensors.

In the shelf position shown in FIGS. 2A-B, the transcutaneous parts 212, 222 are positioned such that their distal surfaces—furthest away from the skin surface—are in contact with the proximal surface 605 of the proximal first part 604 of the functional first part 600. The introducer needles 218, 228 are extending through or surrounding the subcutaneous parts 216, 226 partly or fully. The transcutaneous parts 212, 222 are thereby kept in position due to the friction between the introducer needles 218, 228 and the soft contact parts of the transcutaneous part 212, 222, i.e. the subcutaneous parts 216, 226.

Figures 7A, 7B, 7C:
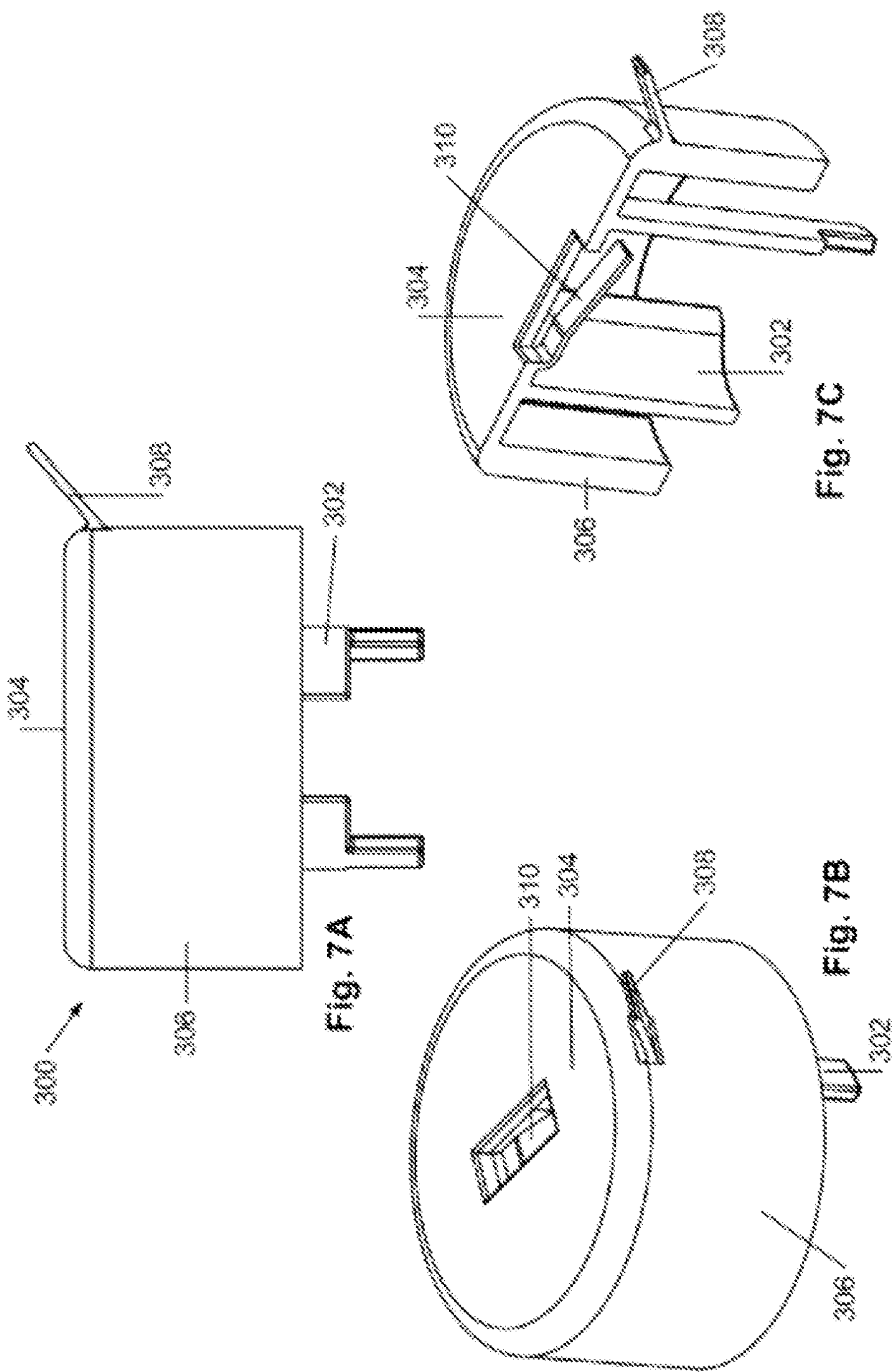
FIGS. 7A-C show the cap of the inner inserter part in a front view (FIG. 7A), a perspective view (FIG. 7B) and a perspective cut-through view (FIG. 7C).

The cap 300 shown in detail in FIGS. 7A-C is positioned at the distal end of the inner inserter part 200 furthest away from the base part 202. The cap 300 comprises an inner cap part 302, a distal cap part 304 being substantially parallel to the surface of the patient's skin, and an outer cap part 306. The inner cap part 302 is tube-shaped with the tube extending in the direction of insertion, and supports a primary spring 230 positioned around the inner cap part 302. The primary spring 230 is further supported at its distal end by the proximal surface of the distal cap part 304.

The cap 300 further comprises a first cap spring 308, which is placed between the cap 300 and an inner surface of the first cover part 104. The first cap spring keeps the first cover part 104 pushed away from the cap 300 in the shelf position. This necessitates an additional action from the user when the inserter 100 is to be activated, namely pushing the first cover part 104 towards the cap 300 in order for the protruding parts 112 of the first cover part 104 to be correctly positioned opposite the release positions 506 on the release ring 500. Thus, the user needs to push the first cover part 104 in the direction towards the patient's skin before insertion can be activated by pressing the activation points 108. This is an easily performed and a natural thing to do for the user, especially if the user is the patient him/herself. As pushing the first cover part 104 in the direction of the patient's skin does not activate the subcutaneous insertion itself, the psychological barrier often associated with pressing a needle through the skin, is not a problem with this inserter 100, as the insertion step is initiated by applying a pressure in a direction parallel to the surface of the skin (direction Y shown in FIG. 2A), i.e. a direction perpendicular to the direction of insertion (direction X shown in FIG. 3A).

In FIG. 3B, the first cap spring 308 is shown as extending out of the inserter. This is due to an error in the drawing program used and does not reflect the reality.

The distal cap part 304 may further comprise a second cap spring 310, which reduces sound when the retraction takes place. In the shown embodiment the second cap spring 310 is a flat spring made of same material as the cap 300 and an integrated part of the cap 300.

Figures 8A, 8B, 8C:
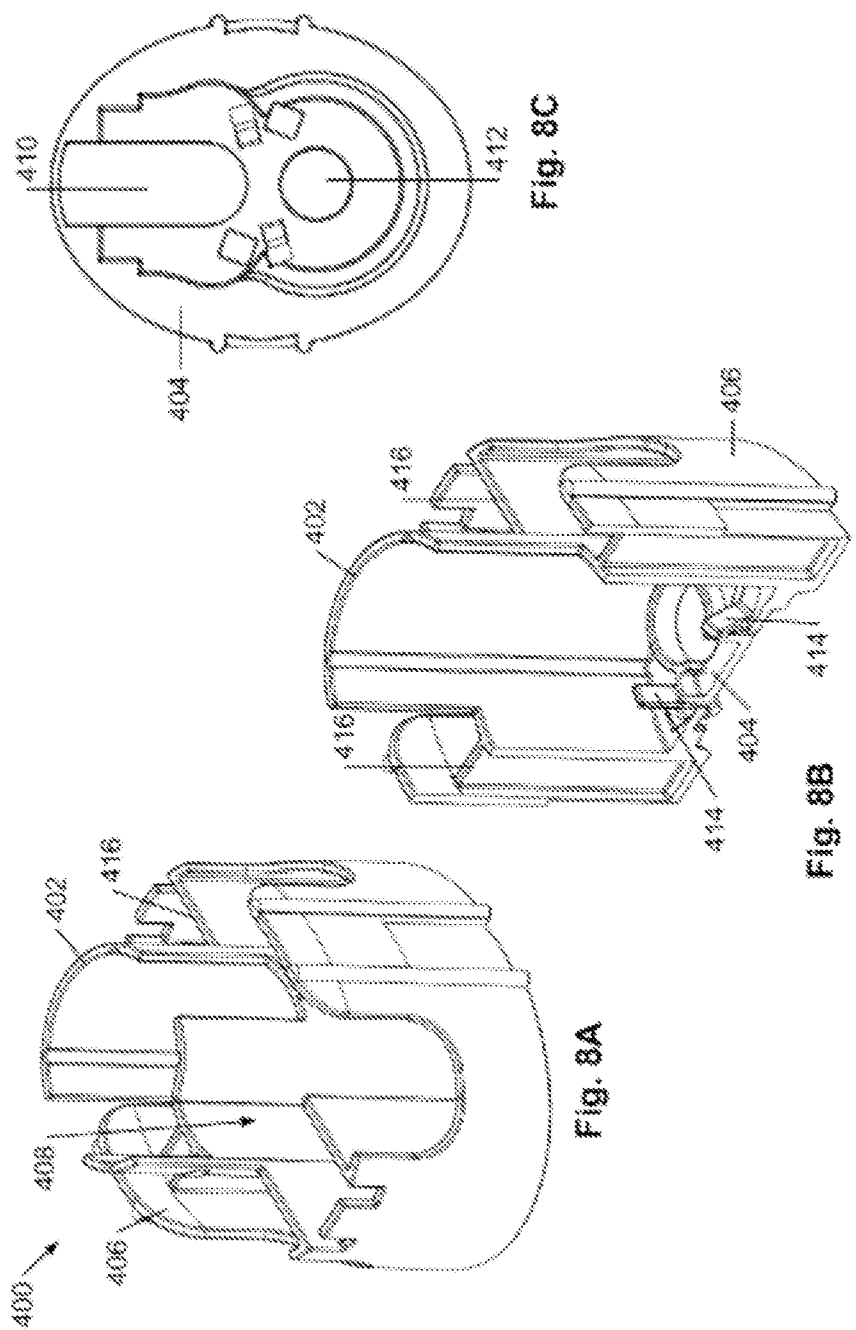
FIGS. 8A-C show the housing of the inner inserter part in a perspective view (FIG. 8A), a perspective cut-through view (FIG. 8B) and a 'bottom' view (FIG. 8C).

The housing 400 shown in detail in FIGS. 8A-B comprises an inner housing part 402, a proximal housing part 404 and an outer housing part 406. The inner housing part 402 is shaped as a not fully closed tube extending in the direction of insertion (direction X shown in FIG. 3A).

The proximal housing part 404—being substantially parallel to the surface of the patient's skin—comprises a first opening 410 and a second opening 412 for the first port 210 and the second port 220 of the base part 202, respectively. There is also an opening 408 in the tube-shaped inner housing part 402 in order to facilitate room for the sensor port 210. The openings 410, 412 are so small that is not possible for a user to put a finger through one of the openings 410, 412 and e.g. get in contact with the introducer needles 218, 228.

The distal portion of the inner housing part 402 is positioned in between the inner cap part 302 (where around the distal end of the primary spring 230 is positioned) and the outer cap part 306. The inner housing part 402 is further engaging with the proximal surface of the distal cap part 304. The distal portion of the outer housing part 402 is parallel with and engaging with the proximal portion of the first cover part 104.

Inside the inner housing part 402 is found the release ring 500 and the functional first part 600, the latter again enclosing the functional second part 700 in the shelf position. On a portion of the distal surface of the proximal housing part 404 found inside the inner housing part 402 there are protruding release parts 414 for engaging with corresponding protruding release parts 716 on the functional second part 700 during insertion of the transcutaneous parts 212, 222. The fourth part 400 further comprises distal supports surfaces 416 engaging with and supporting the proximal surface 508 of the release ring 500.

The release ring 500 comprises two protruding release ring parts 502 positioned opposite each other on the release ring 500 and pointing inwardly, and two proximal extending release ring parts 504 each of which is positioned adjacent to the two protruding release ring parts 502. The release ring 500 further comprises two release positions 506 positioned opposite each other on the release ring 500 and displaced approximately 90 degrees in relation to the two protruding release ring parts 502.

The functional first part 600 is functioning as an insertion part, which is released from the release ring during insertion. The functional first part 600 comprises an inner first part 602, a proximal first part 604 being substantially parallel to the surface of the patient's skin, and an outer first part 606. The inner first part 602 and the outer first part 606 are shaped as tubes extending in the direction of insertion (direction X shown in FIG. 3A).

Extending from the distal surface of the proximal first part 604 and adjacent to the outer first part 606 is a ring-shaped protruding ring 608, which supports the proximal end of the primary spring 230. The inner surface 607 of the outer first part 606 ensures that the primary spring 230 can only expand in the direction of insertion/retraction (X, X') and thus not be displaced in the plane perpendicular to the direction of insertion/retraction.

Inside the inner first part 602 and supported by the distal surface 603 of the proximal first part 604 is found the proximal end of the secondary spring 232. The distal surface 603 of the proximal first part 604 thus supports both the primary spring 230 and the secondary spring 232.

The inner surface 609 of the inner first part 602 ensures that the secondary spring 232 can only expand in the direction of insertion/retraction and thus not be displaced in the plane perpendicular to the direction of insertion/retraction.

The proximal first part 604 comprises a first opening 610 and a second opening 612 through which the first introducer needle 218 and the second introducer needle 228, respectively, extends during insertion. The proximal first part 604 further comprises two release openings 614 for engaging with corresponding protruding release parts 716 on the functional second part 700.

On the outside of the outer second part 606 are protruding surface sections 616 comprising a proximal surface 618 and a distal surface 620. In the shelf position, the distal surface 510 of the protruding release ring parts 502 on the release ring 500 engages with the proximal surface 618 of the protruding surface sections 616, thereby securing the primary spring 230 in a loaded position.

The functional second part 700 is functioning as a retraction part, which is retracted from the functional first part 600 after insertion of the transcutaneous parts 212, 222. The functional second part 700 comprises an inner second part 702, a distal second part 704 being substantially parallel to the surface of the patient's skin, and an outer second part 706. The inner second part 702 is shaped as a tube extending in the direction of insertion. The inner second part 702 comprises a first tube section 708 and a second tube section 710, where the diameter of the second tube section 710 is larger than that of the first tube section 708, thereby creating a proximal second tube section surface 712, which supports the distal end of the secondary spring 323. The secondary spring 323 is further supported by the outer surface 709 of the first tube section 708 around which is extends. The first tube section 708 thus ensures that the secondary spring 232 can only expand in the direction of insertion/retraction (X, X') and thus not be displaced in the plane perpendicular to the direction of insertion/retraction.

The distal ends of the introducer needles 218, 228 are secured in the distal second part 704, such that the introducer needles 218, 228 are extending from the proximal surface of the distal second part 704 in the direction of insertion.

The outer second part 706 comprises two legs 714 extending in the direction of insertion. The proximal end of the legs 714 comprises protruding release parts 716 in the shape of inwardly pointing hooks. In the shelf position, the distal surface 718 of the protruding release parts 716 engages with the release openings 614 in the functional first part 600, whereby the functional second part 700 is secured inside the functional first part 600 and the secondary spring 232 is secured in a loaded position.

When using the inserter 100 and positioning the transcutaneous parts 212, 222, the user has to perform the following 7 steps:

1. Remove the tamperproof band 110;
2. Remove the second cover part 106 from the first cover part 104 and expose the adhesive surface 206 of the base part 204;
3. Place the open proximal end of the inserter 100 without the second cover part 106 against the skin of the patient (the adhesive surface 206 of the base part 204 is adhered to the patient's skin during this step);
4. Push the first cover part 104 towards the skin of the patient until it cannot be pushed further;
5. Push at the activation points 108 towards each other, whereby the automatic insertion of the transcutaneous parts 212, 222 followed by retraction of the intro-ducer needles 218, 228 is activated;
6. Remove the inserter device from the patient's skin and optionally re-position the second cover part 106 at the open end of the first cover part 104, and
7. Dispose the used inserter 100 with or without the second cover part 106.

When the insertion of the transcutaneous parts 212, 222 in step S is initiated by pressing the activation points 108 towards each other, the release ring 500 is deformed. By the deformation of the release ring 500, the distance between the release positions 506 positioned opposite each on the release ring 500 is decreased at the same time as the distance between the protruding release ring parts 502 is increased.

As the distance between the protruding release ring parts 502 increases, the distal surface 510 of the protruding release ring parts 502 no longer engages with the proximal surface 618 of the protruding surface sections 616 of the functional first part 600. This allows the primary spring 230 to expand in the direction of insertion (direction X) from the loaded to an unloaded position whereby the functional first part 600—whereto the functional second part 700 is secured—and the transcutaneous parts 212, 222 positioned adjacent to the proximal surface 605 of the fourth part 500 are pushed towards the patient's skin, thus inserting the transcutaneous parts 212, 222 subcutaneously in the patient's skin (see FIGS. 3A-B for the inserted position). During insertion, the transcutaneous parts 212, 222 are locked in the corresponding transcutaneous ports 210, 220 by not shown corresponding locking means on both the transcutaneous parts 212, 222 and the transcutaneous ports 210, 220.

During insertion of the transcutaneous parts 212, 222, the protruding release parts 716 on the functional second part 700 come in direct contact with the protruding release parts 414 on the housing 400. This pushes the protruding release parts 716 outwards and away from each other whereby the distal surface 718 of the protruding release parts 716 is no longer secured in the release openings 614 in the functional first part 600. This again allows the secondary spring 232 to expand from the loaded position to an unloaded position, thereby pushing the functional second part 700 in a direction away from the patient's skin.

As the introducer needles 218, 228 are attached to the functional second part 700, the introducer needles 218, 228 are retracted to a position inside the housing 400 (see FIGS. 4A-B). The introducer needles 218, 228 are thereby no longer exposed and the patient will not be able to see the introducer needles 218, 228 or touch them. The inserter 100 is now separated from the transcutaneous parts 212, 222 and the base part 202 and can consequently be safely removed from the patient's skin and disposed in an ordinary garbage can without there being any risk of repeating the injection procedure.

LIST OF REFERENCES

100 Inserter device
102 Two-part cover
104 First cover part
106 Second cover part
108 Activation points
110 Tamperproof band
112 Protruding parts
200 Inner inserter part
202 Base part
204 Proximal surface of the base part
206 Adhesive surface
210 First port/sensor port
212 First transcutaneous part/sensor part
214 Body of the first transcutaneous part
216 First subcutaneous part
218 First introducer needle
220 Second port/cannula port
222 Second transcutaneous part/cannula part
224 Body of the second transcutaneous part
226 Second subcutaneous part
228 Second introducer needle
230 Primary spring
232 Secondary spring
300 Cap
302 Inner cap part
304 Distal cap part
306 Outer cap part
308 First cap spring
310 Second cap spring
400 Housing
402 Inner housing part
404 Proximal housing part
406 Outer housing part
408 Opening in the inner housing part
410 First opening in the proximal housing part
412 Second opening in the proximal housing part
500 Release ring
502 Protruding release ring part
504 Proximal extending release ring part
506 Release position
508 Proximal surface of the release ring
510 Distal surface of the protruding release ring part
600 Functional first part/insertion part
602 Inner first part
603 Distal surface of the proximal first part
604 Proximal first part
605 Proximal surface of the proximal first part
606 Outer first part
607 Inner surface of the outer first part
608 Protruding ring
609 Inner surface of the inner first part
610 First opening in the proximal first part
612 Second opening in the proximal first part
614 Release openings in the proximal first part
616 Protruding surface section
618 Proximal surface of the protruding surface section
620 Distal surface of the protruding surface section
700 Functional second part/retraction part
702 Inner second part

704 Distal second part
706 Outer second part
708 First tube section of the inner second part
709 Outer surface of the first tube section
710 Second tube section of the inner second part
712 Proximal second tube section surface
714 Leg
716 Protruding release part on the leg
718 Distal surface of the protruding release part
X Direction of insertion
X' Direction of retraction
Y Direction of activation of the inserter

The invention claimed is:

1. An inserter for simultaneous subcutaneous insertion of a first transcutaneous part and a second transcutaneous part in a patient, the inserter comprising:

a cover;

a support configured to guide the first and second transcutaneous parts during insertion thereof in the patient, wherein the support includes a first functional part with a proximal first part having a proximal surface, a first projection appended to the proximal surface such that the first projection extends beneath the proximal surface in a vertical direction, and a second projection spaced from the first projection and appended to the proximal surface such that the second projection extends beneath the proximal surface in the vertical direction, wherein the first projection includes an arcuate surface and the second projection includes a flat surface, wherein the first transcutaneous part includes a first transcutaneous surface shaped complementary to the arcuate surface and arranged in contact with the arcuate surface of the first projection, and wherein the second transcutaneous part includes a second transcutaneous surface arranged in contact with the flat surface of the second projection, and an activation unit configured to initiate simultaneous subcutaneous insertion of the first and second transcutaneous parts in the patient.

2. The inserter of claim 1, wherein the activation unit comprises at least one activation member positioned on the cover and configured for depression to activate the inserter in response to a pressure applied to the activation member in a direction substantially perpendicular to the insertion direction of the first and second transcutaneous parts.

3. The inserter of claim 2, further comprising:

at least one leg having a release part defined at a distal end thereof; and a housing having a release part corresponding to the release part of the at least one leg, wherein the corresponding release part of the housing includes at least one tab sized for structural contact with the release part of the at least one leg.

4. The inserter of claim 3, wherein the at least one leg is configured for deformation in response to structural contact between the release part of the at least one leg and the corresponding release part of the housing in use of the inserter to cause the inserter to translate to a retracted position in which the inserter is separated from the first and second transcutaneous parts.

5. The inserter of claim 4, further comprising:

a retraction element including a secondary spring that extends in the insertion direction of the first and second transcutaneous parts and is configured to drive translation of the inserter to the retracted position after insertion of the first and second transcutaneous parts in the patient; and a second functional part at least partially supporting the secondary spring.

6. The inserter of claim 1, further comprising:

a first introducer needle that, in a pre-use position of the inserter, at least partially surrounds the first transcutaneous part and at least partially secures the first transcutaneous surface of the first transcutaneous part in contact with the arcuate surface of the first projection; and a second introducer needle that, in the pre-use position of the inserter, at least partially surrounds the second transcutaneous part and at least partially secures the second transcutaneous surface of the second transcutaneous part in contact with the flat surface of the second projection.

7. The inserter of claim 1, further comprising a driving element including a primary spring that extends in the insertion direction of the first and second transcutaneous parts, wherein the primary spring is configured to drive movement of the first functional part to cause simultaneous subcutaneous insertion of the first and second transcutaneous parts in the patient with the inserter.

8. The inserter of claim 7, further comprising a release ring, wherein the primary spring is configured to drive movement of the first functional part in use of the inserter between a first position, in which the release ring contacts the first functional part to secure the inserter in a pre-use position, and a second position, in which the release ring is decoupled from the first functional part in an inserted position of the inserter.

* * * * *